INVENTOR.
Bern B. Grubb

Jan. 12, 1965    B. B. GRUBB    3,164,850
EMERGENCY PATIENT SUPPORTING DEVICE
Filed Nov. 22, 1963    3 Sheets-Sheet 2

INVENTOR.
Bern B. Grubb
BY
Lockwood, Woodard, Smith & Weikart
Attorneys

Jan. 12, 1965
B. B. GRUBB
3,164,850
EMERGENCY PATIENT SUPPORTING DEVICE
Filed Nov. 22, 1963
3 Sheets-Sheet 3
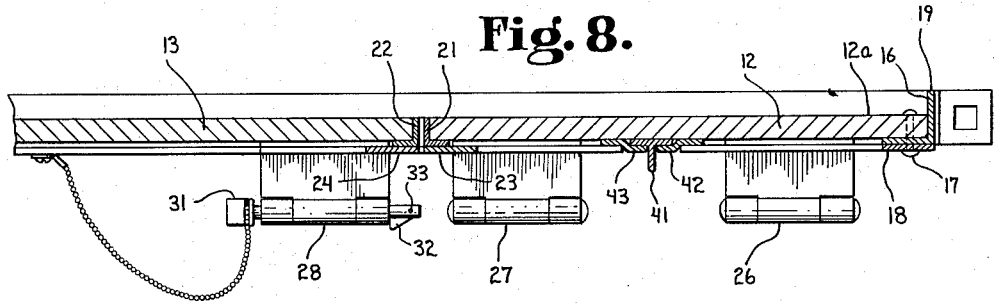
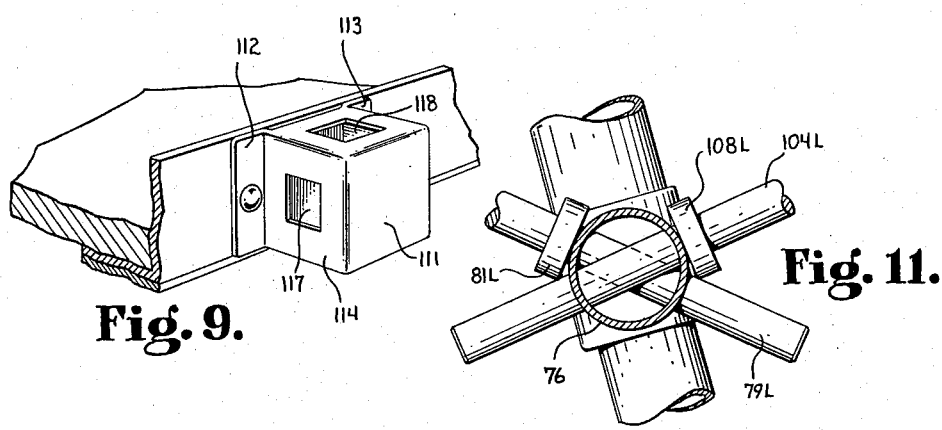
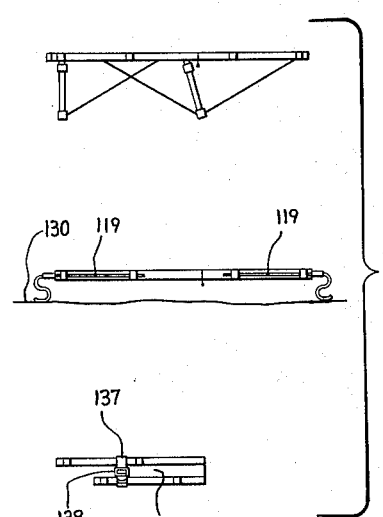
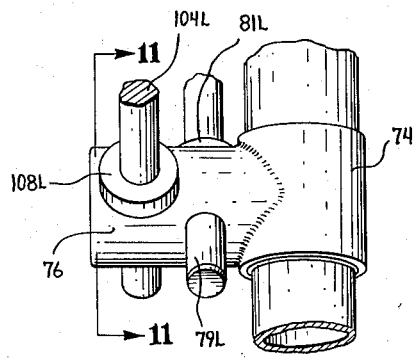
INVENTOR.
Bern B. Grubb
BY
*Lockwood, Woodard, Smith & Weikart*
Attorneys

3,164,850
EMERGENCY PATIENT SUPPORTING DEVICE
Bern B. Grubb, 1621 E. Broadway, P.O. Box 224,
Logansport, Ind.
Filed Nov. 22, 1963, Ser. No. 325,724
4 Claims. (Cl. 5—81)

This invention relates generally to medical equipment and more particularly to a device useful as a litter, a cot, an operating table, and for other similar or related uses.

Litters, cots, operating tables, and other means for supporting patients are well known and available in a variety of types. There are few of these devices, however, which are suitable for more than one specific function. The result is the fact that when people become sick or are injured or otherwise become unable to walk, they are subjected to a number of shifts from different kinds of equipment from the time they are first attended until the time they are attended by a surgeon in a hospital, for example. They may first be moved onto a litter at an accident scene, and then transferred to a cot or similar apparatus in an ambulance. Upon arrival at the hospital they are transferred several more times before reaching an operating table.

All of this handling of the patient, which is frequently necessary, requires jostling and disturbing the patient during each transfer from one supporting device to another. This subjects him to the chance of considerable further injury between the time he is attended at the accident scene and the time he is attended in the hospital by an operating physician, for example.

It is, therefore, a general object of the present invention to provide a device which can be used at essentially all of the steps from an accident scene to a hospital recovery room without removal of the patient therefrom.

A further object is to provide a device which can be made light in weight and compact in size and yet achieve the aforementioned objective.

A still further object is to provide a device which lends itself well to construction from readily available and low-cost materials.

Described briefly, a typical embodiment of the present invention incorporates a board which is made of wood or other suitable material having a main portion with three other portions hinged thereto. Legs of adjustable length are mounted to the main portion and leg braces are mounted both to the main portion and to the hinged portions. These legs have casters mounted at the lower ends thereof, which may be of the locking type.

The board has a plurality of brackets mounted thereto which are apertured in a manner whereby they can receive unique bars which are so formed as to be useful as handles and supports for the board, and alternatively as standards for holding intravenous feeding solution bottles, or the like.

The full nature of the invention will be understood from the accompanying drawings and the following description and claims.

FIG. 8 is an enlarged fragmentary section taken along the line 8—8 in FIG. 4 and viewed in the direction of the arrows.

FIG. 9 is an enlarged perspective view of the combination mounting bracket for the utility standard and carrying bar.

FIG. 10 is an enlarged fragmentary detail illustrating the connection of the leg braces to a leg.

FIG. 11 is an enlarged fragmentary section thereof taken along the line 11—11 in FIG. 10 and viewed in the direction of the arrows.

FIG. 12 shows the device in miniature, in several different configurations thereof.

Figure 1:
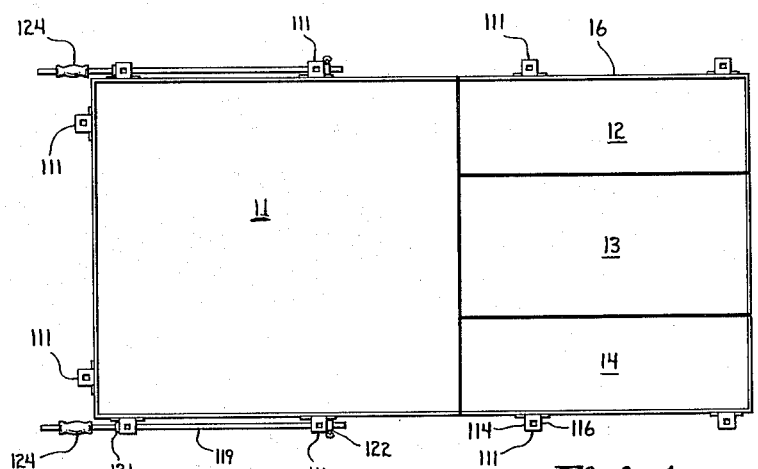
FIG. 1 is a top plan view of the typical embodiment of the present invention.

Referring to the drawings in detail, a table incorporates four planks including a large, almost rectangular main plank 11 and three coplanar planks 12, 13, and 14, hingedly attached thereto. Normally the planks are made of marine grade one-half inch thick plywood, A–A finish. Other materials may also be found to be satisfactory. A five-eighths inch aluminum angle section is provided around the entire table, being secured to the underside of the planks around the outer marginal edges thereof. For example, as shown best in FIGS. 4 and 8, along with FIG. 1, angle section 16 is secured by the means of the rivet 17 to the underside of the plank 12 and an aluminum strap 18 is secured to the underside of the lower flange of the angle section. Because the upper margin of the angle section 19 extends above the upper surface 12a of the plank 12, it facilitates retention of a blanket or other material which may be placed on top of the table. Similar construction is provided all the way around the table, and will not be described in further detail. One further feature, is the provision of angle sections such as 21 and 22 along the facing marginal edges of the planks 12 and 13. These provide desirable rigidity and the upper edges thereof are flush with the upper surfaces of the planks 12 and 13. Aluminum straps 23 and 24 are secured to the undersides of the angle sections 21 and 22, respectively, and rivets may be used for this purpose. Illustration of the rivets showing the attachment of the straps to the angle sections is avoided, in order to simplify the appearance of the drawings, and means other than rivets may also be found satisfactory.

The planks 12, 13, and 14 are hingedly fastened to the plank 11. For this purpose, hingles 26 and 27 are attached to the facing ends of the plank 12 and plank 11. They permit the downward folding of the plank 12 with respect to plank 11. An identical arrangement is provided for the plank 14. A similar arrangement is provided for the plank 13. However, the hinges 28 and 29 therefor have removable pins 31 having tapered, gravity-operated lugs 32 pinned to their inner ends by pins 33. These hinge pins 31 are removable, making it possible to remove the plink 13 entirely from the table, when and if desired. They also make it possible to turn the plank over after removal and again attach it with the removable pins and tilt the plank upwardly, in the event that the feet of the patient need to be elevated. Ordinarily, however, the plank 13 is maintained in place as illustrated by the hinges 28 and 29, as well as the spring loaded slide bolts 34 and 36 which are mounted on the planks 12 and 14, respectively. These bolts are received in receivers 37 and 38, mounted to the plank 13.

Figure 4:
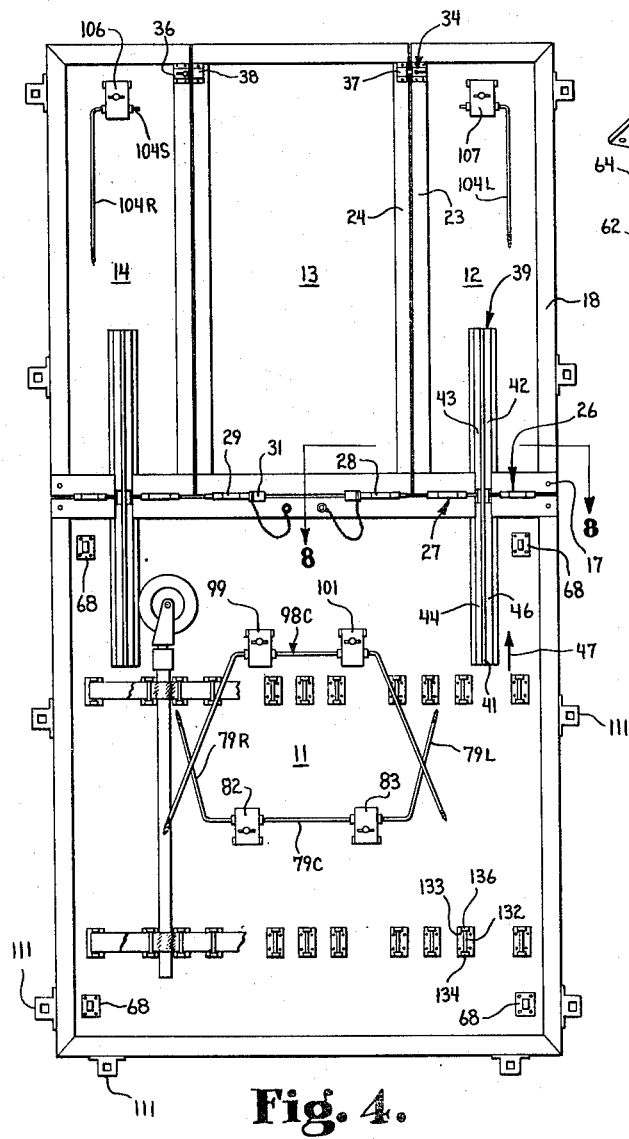
FIG. 4 is an enlarged bottom plan view of the typical embodiment, with the support legs and carrying handles removed.

In order to maintain plank 12 securely and rigidly in coplanar relationship to the plank 11, a stiffener 39 is provided in the form of a T-section 41 received in a channel formed by four offset plates 42, 43, 44, and 46. The latter two of these are secured to the underside of the plank 11, while the former two are secured to the underside of the plank 12. The T-section 41 is slid into place in the direction of the arrow 47 (FIG. 4).

Figure 2:
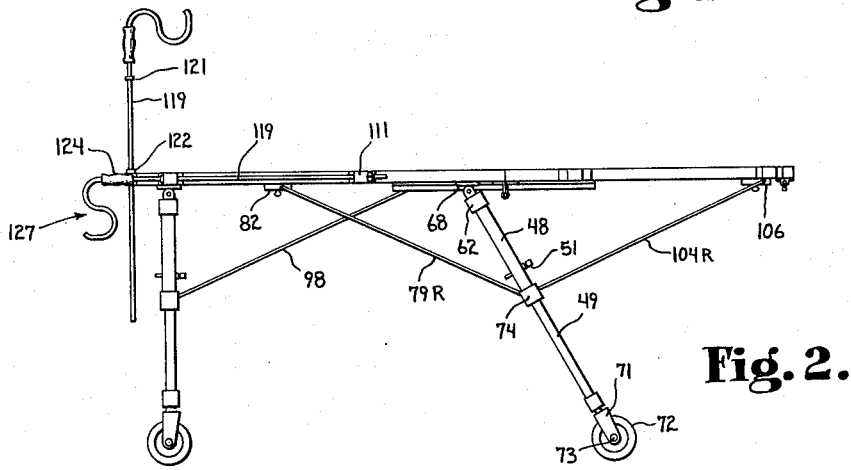
FIG. 2 is a side elevational view thereof.
Figure 7:
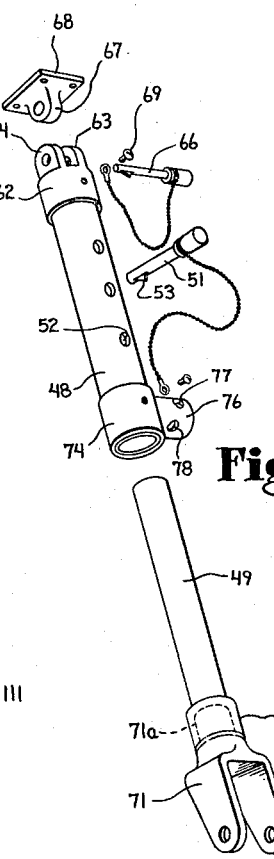
FIG. 7 is an enlarged exploded perspective view of a typical leg assembly.

Referring now to FIG. 2, the table is supported by four leg assemblies, two of which are shown in FIG. 2. All four of these may be identical, and are typically constructed as shown in detail in FIG. 7. Referring specifically to FIG. 7, the leg assembly typically includes an upper tube 48 which receives a lower tube 49 telescopically. The degree to which the lower tube extends upwardly in the upper tube is controlled by a removable pin 51 receivable in any one of the three apertures 52 and having the gravity-operated lugs 53. These pins are identical to the hinge pins. The overall length of the leg assembly can thereby be adjusted. This not only accommodates the use of identical leg assemblies for all four legs even though the front legs are inclined as shown in FIG. 2. It also facilitates the increasing and decreasing of the height of the table when mounted on the legs.

The upper tube has a sleeve 62 secured to the upper end thereof and having a yoke 63 at the upper end of the sleeve. The yoke has apertures 64 therein to receive the leg hinge pin 66 which passes through the lug 67 of the plate 68 secured to the underside of the table. The sleeve 62 may be secured to the tube by means of a screw 69 or by other means, if desired.

A caster yoke 71 has a pintle 71a received in the collar 71b secured to the lower end of the lower tube 49. The caster wheel 72 (FIG. 2) is mounted on the axle 73. The type of caster having a braking means to prevent rolling and swivelling, can be used if desired. The inside diameter of the collar may be the same as that of the upper tube 48 so that the caster pintle can be received by the upper tube in the event the lower tubes are removed. This facilitates use of the device as a cot, and rolling it into and out of an ambulance.

A sleeve 74 is provided at the lower end of the upper tube and has a horizontally extending brace bracket 76 theron having apertures 77 and 78 apparent in FIG. 7.

Referring again to FIG. 2, the two front legs are disposed at an angle so that the wheels such as 72 are disposed below the forward portion of the table, although the leg mounting plates such as 68 are mounted to the underside of the board 11. The rear legs are disposed vertically.

Figure 6:
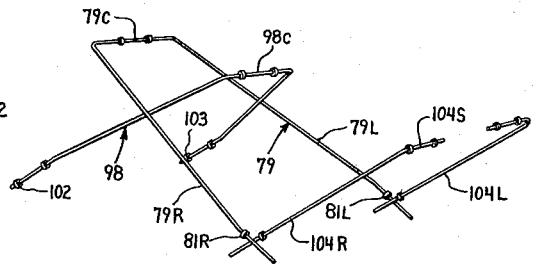
FIG. 6 is a perspective view illustrating the leg bracing arrangement showing the orientation of the braces themselves.

Bracing for the legs will be understood best by reference to FIG. 2 along with FIG. 6. A generally U-shaped brace 79 braces the front legs from the rear. This brace includes the arms 79R and 79L joined by a bight portion 79C. Collars 81R and 81L are secured to the arms near their distal ends. The distal ends of the arms pass through apertures such as 78 in FIG. 7 whereupon the collars abuttingly engage the outer surface of the leg brace receiving brackets. This is shown in greater detail in FIG. 11 which represents the left front leg brace attachment detail.

The bight portion of the brace is secured to the table plank 11 by a pair of brackets 82 and 83. Details of these brackets can be better understood by reference to FIG. 5.

Figure 5:
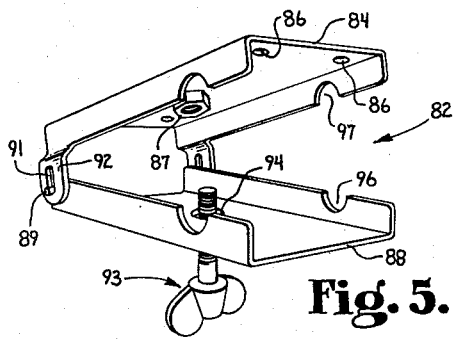
FIG. 5 is an enlarged perspective view of a leg brace mounting bracket.

In FIG. 5, the bracket includes an upper plate 84 having apertures 86 therein to receive screws or rivets or other means for fastening the upper plate to the underside of the plank 11. The upper plate has a thread nut 87 welded or otherwise attached to the underside thereof. A lower plate 88, having a configuration similar to the upper plate, is pivotally mounted thereto by means of pins 89 received in slots 91 in the depending ears 92 of the upper plate. The lower plate has a wingbolt 93 received in a central aperture 94 therein and which is threadedly receivable in the nut 87 in the upper plate. Thus, the lower plate can be drawn toward the upper plate by the wingbolt. In so doing, the semicircular notch 96 in the upstanding side flanges of the lower plate are brought close to the semicircular notches 97 in the depending side flanges of the upper plate. The bight portion of the leg brace is received in these notches whereupon the wingbolt can be tightened to clamp the lower plate securely against the bight portion of the leg brace. Thus, the leg brace is positively attached to the underside of the table plank 11.

Support for the rear legs is provided by a similar brace 98. The bight portion 98c of this brace is received in clamp brackets 99 and 101 secured to the underside of the plank 11. The distal end portions of the arms of this brace are received in the brace receiving brackets of the rear legs and, because there are not braces extending from the rear of these legs, removable collars 102 and 103 are employed on these arms to secure them firmly to the brace receiving brackets on the rear legs. These collars may be attached by set screws, for example.

The front braces for the front legs are somewhat different from the U-shaped braces heretofore described. For example, brace 104R is generally L-shaped, with the short leg 104S thereof received in a clamp 106 (FIG. 4) secured to the underside of the plank 14. The distal end of the long arm portion of this brace is received in the brace receiving bracket of the leg. Likewise, the short leg of the front brace 104L is received in the bracket 107 mounted to the underside of the table plank 12, whereas the distal end portion of the long leg thereof is received in an aperture such as 77 in FIG. 7, in the brace receiving bracket of the left front leg. This is shown in detail in FIGS. 10 and 11. The collar 108L secured to the distal end portion of the brace 104L engages the outer cylindrical surface of the brace receiving bracket, providing a stop in the same manner as the collar 81L does provide a stop. The leg is thereby prevented from moving forward or backward once the braces are installed.

Figure 3:
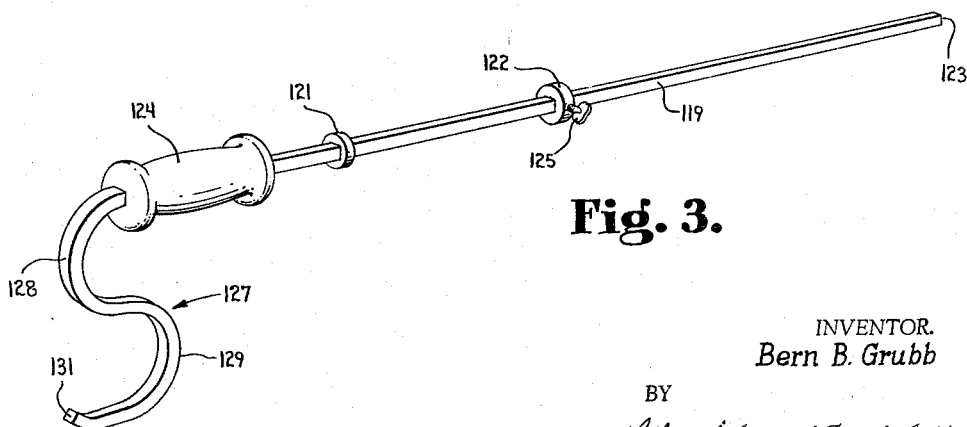
FIG. 3 is an enlarged perspective view of the combination litter-handle and utility-standard bar employed according to the present invention.

Eight brackets 111 are mounted along the sides of the table and two of these brackets are mounted at the head-end of the table. More such brackets can be employed if desired. Details of the brackets and mounting can be better appreciated by reference to FIG. 9 where it is shown that the brackets are generally box-like having flanges 112 and 113 riveted to the angle sections at the sides of the table planks. On the rear wall 114 and the front wall 116 of each bracket (FIG. 1) there is a square aperture such as aperture 117. The aperture in the front wall is horizontally aligned with the aperture in the rear wall. Similarly, in the top and bottom walls of the bracket box are square apertures of identical size and in vertical alignment with each other. Aperture 118 is typical. The function of these apertures will become apparent immediately. Referring to FIG. 3, a bar 119 of rectangular cross section is provided and the cross section of this bar is of a size receivable in the rectangular apertures in the bracket boxes 111. This bar has a stop collar 121 fixed thereto and an adjustable collar 122 removable therefrom and securable thereto anywhere between the collar 121 and the distal end 123 by tightening the wingbolt 124. Four of these bars are typically provided and are receivable in the bracket boxes as mentioned. The manner in which this is done is shown in FIGS. 1 and 2. The stop collars 121 are so located that the handle grips 124 provided on the bars extend beyond the head-end of the table. These handle grips are thereby conveniently disposed for wheeling the table around on the caster wheels. However, with the addition of two more of such bars and grips in the bracket boxes mounted to the planks 12 and 14, as suggested in the central view of FIG. 12, these bars are effective to function as supports for the table when it is used as a stretcher or litter, the grips 124 being held by a litter bearer on each end of the table. Normally, for use of the table as a litter, the legs are either folded or removed as shown in the central view of FIG. 12.

The handle ends of the bars are provided with a generally S-shaped offset 127. This includes the forward bend 128 and the reverse bend 129 whose distal end 131 is curved upwardly toward the handle 124. As suggested in the central view of FIG. 12, the distal end portion of the offset of the stretcher bar can rest on the ground surface 130 and thereby support the stretcher above the ground surface.

These stretcher support bars also have another function made possible by the novel box brackets 111. As shown in FIG. 2, the bar 119 may be supported in the vertically aligned square apertures of the bracket boxes and the elevation thereof determined by the positioning of the adjustable collar 122 on the bar. It can then be used to support a bottle for blood transfusions, intravenous feeding, or other purposes. It thereby serves as a utility standard.

It has already been mentioned that the device of the present invention can conveniently be used as a cot. This is normally done by removing the lower portions of the leg assemblies whereupon the device has the general appearance indicated by the top illustration in FIG. 12 of the drawings. The legs remain firmly braced because the frace receiving brackets are mounted at the lower ends of the upper leg portions.

In order that all portions of the device be kept together even though it is used in different configurations for different purposes, a plurality of rollers 132 (FIG. 4) is mounted to brackets 133 secured to the underside of the plank 11. The brackets 133 include downwardly depending ears 134 and 136 which receive a shaft around which the roller 132 is supported for rotation. These rollers are mounted in spaced relation across the plank and receive straps (not shown), for securing the various temporarily unused portions of the device to the underside of the plank 11.

Even when such portions are so stored under the plank 11, the planks 12, 13, and 14 can be folded back thereunder such as illustrated in the lower illustration in FIG. 12 of the drawing. In this instance, the planks are secured by the strap 137 having a conventional buckle 138 which may be of the standard sliplock type. Because of the arrangement of the hinges with the hinge pins extending below the undersides of the planks, there is an adequate space 139 between the planks when the assembly is folded to accommodate the legs, braces, handle bars, wheels, and stiffeners. It is to be noted that all of these parts which are to be stored under the plank 11 are shorter than plank 11 to accommodate storage thereunder. The lower and upper leg portions are separated, for this purpose. An example of how a leg may be strapped to the underside of the plank of the table is ilustrated in FIG. 4. The rollers facilitate tightening of the straps.

From the foregoing description, it should be apparent that the present invention is excellently well suited to the objects set forth hereinabove as well as being capable of achieving other objects not specifically mentioned. For example, if it is desired that a patient sit up temporarily as might be required in outpatient departments of hospitals, the center plank 13 can be released from the side planks 12 and 14 by operating the spring biased bolts 34 and 36. This allows the patient to sit on the plank 11 with his legs dangling between the planks 12 and 14 without interfering with the leg braces.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An emergency patient supporting device comprising: an elongated table having a first plank extending approximately one-half the length of said table and having three elongated planks lying coplanar with said first plank, each of said three planks being hingedly connected at one end thereof to an end of said first plank and selectively movable independently of each other plank of said three elongated planks; four leg means, each leg means including an upper portion and a lower portion, with said lower portion being adjustably mounted to the upper portion to change the overall length of the combination of the upper and lower portions, a locking caster wheel at the lower end of the said lower portion, and a removable hinge pin pivotally attaching the upper end of said upper portion of each of said leg means to the underside of said table, said caster wheel being mountable to the lower end of said upper portion upon removal of said lower portion from said upper portion; brace means attached to said leg means and said table, said brace means including a first brace clamped to the underside of one of said three elongated planks and engaging the upper portion of one of said leg means to maintain said upper portion in an erect condition, and a second brace clamped to the underside of another of said three elongated planks and engaging the upper portion of another of said leg means to maintain erect said upper portion of said another of said leg means; and a plurality of bracket boxes mounted along side margins of said table, each of said boxes having a pair of vertically aligned square apertures and each of said boxes having a pair of horizontally aligned square apertures; carrying bars of square cross section received in said horizontally aligned apertures and having adjustable stop collars thereon engageable with said boxes to position said bars longitudinally of said table, and said bars having hand grips mounted thereon adjacent opposite ends of said table and extending beyond said opposite ends to receive the hands of litter bearers and facilitate carrying the table by litter bearers, said bars having generally S-shaped end portions extending beyond and below said grips and engageable with a ground surface to support said table as a platform; said upper and lower portions of said leg means, said bars, and said braces being of a length less than the length of the first plank of said board, to accommodate storage thereof on the underside of said first plank; and roller and strap means on the underside of said first plank facilitating securing portions of said device on the underside of said first plank.

2. In an emergency patient supporting device, the combination comprising: a table; a plurality of bracket boxes mounted along side margins of said table, each of said boxes having a pair of vertically aligned square apertures and each of said boxes having a pair of horizontally aligned square apertures; four one-piece carrying bars of square cross section received in said horizontally aligned apertures and having adjustable stop collars thereon engageable with said boxes to position said bars longitudinally of said table, and said bars having hand grips mounted thereon adjacent opposite ends of said table and extending beyond said opposite ends to receive the hands of litter bearers and facilitate carrying the table by litter bearers, said bars having integral generally S-shaped end portions of material homogeneous therewith and extending beyond and below said grips and engageable with a ground surface to support said table as a platform; an additional bracket mounting box located at an end margin of said table and identical to said side margin mounted bracket boxes; and an additional carrying bar identical to the said carrying bars but received in the vertically aligned apertures of said additional box and having the S-shaped end portion thereof disposed substantially above said additional mounting box to support a bottle or the like.

3. In an emergency patient supporting device, the combination comprising: a table; a plurality of bracket means mounted along side margins of said table, each of said bracket means having a pair of horizontally aligned apertures; four one-piece carrying bars having a cross section fittingly received and non-rotatable in said horizontally aligned apertures, and said bars having hand grips thereon adjacent opposite ends of said table and extending beyond said opposite ends to receive the hands of litter bearers and facilitate carrying the table by litter bearers, said bars having integral generally S-shaped end portions of material homogeneous therewith extending beyond and below said grips and engageable with a ground surface to support said table as a platform.

4. An emergency patient supporting device comprising: a table having a first plank and having three elongated planks lying coplanar with said first plank, each of said three planks being hingedly connected at one end thereof to an end of said first plank and selectively movable independently of each other plank of said three planks; four leg means supporting said planks above a ground surface, each leg means including an upper portion and a lower portion, with said lower portion being removable from the upper portion, and means attaching the upper end of said upper portion of each of said leg means to the underside of said first plank whereby any one of said three elongated planks is swingable downwardly as said first plank is supported level above said ground surface by said four leg means; a plurality of bracket means mounted along side margins of said table, each of said bracket means having a pair of aligned apertures; carrying bars received in said apertures in generally horizontal condition and generally vertical condition and having hand grips thereon adjacent opposite ends of said table, said hand grips extending beyond said opposite ends to receive the hands of litter bearers and facilitate carrying the table by litter bearers, said bars having portions formed to function when said bars are disposed in a generally vertical position, as hangers for utility devices; means on the underside of said first plank facilitating securing portions of said device on the underside of said first plank.

References Cited by the Examiner

UNITED STATES PATENTS

| 503,969 | 8/93 | Huddleston | 269—326 |
| 1,199,553 | 9/16 | Hogan | 5—92 X |
| 1,520,589 | 12/24 | Matkovic | 5—311 X |
| 1,785,421 | 12/30 | Nielsen | 5—92 X |

FOREIGN PATENTS

| 350,189 | 7/37 | Italy. |
| 969,355 | 5/50 | France. |

FRANK B. SHERRY, *Primary Examiner.*